United States Patent [19]

Belvedere

[11] 4,343,258

[45] Aug. 10, 1982

[54] BOAT BUMPERS

[76] Inventor: Mark Belvedere, c/o Mrs. Sarubbi, 5063 NW. 6th Ct., Delray Beach, Fla. 33445

[21] Appl. No.: 99,799

[22] Filed: Dec. 3, 1979

Related U.S. Application Data

[63] Continuation-in-part of Ser. No. 59,690, Jul. 23, 1979, abandoned.

[51] Int. Cl.³ .............................................. B63B 59/02
[52] U.S. Cl. ..................................... 114/219; 405/212
[58] Field of Search ...................... 114/219, 220, 77 R; 293/151, 152; 405/211, 212, 215, 70, 71; 403/361, 380, 345

[56] References Cited

U.S. PATENT DOCUMENTS

| 2,328,693 | 9/1943 | Taylor | 9/25 |
| 3,183,875 | 5/1965 | Russell | 114/219 |
| 3,286,680 | 11/1966 | Caretta | 114/219 |
| 3,390,897 | 7/1968 | Moore | 403/361 |
| 3,925,991 | 12/1975 | Poche | 405/71 X |

Primary Examiner—Sherman D. Basinger
Attorney, Agent, or Firm—Joseph Zallen

[57] ABSTRACT

A plurality of interconnecting bumper units. Each unit has a protrusion on one end and a notch on the other with vertical apertures so that ropes may be inserted to hold the interconnecting bumper units at the desired level along the side of a boat.

1 Claim, 16 Drawing Figures

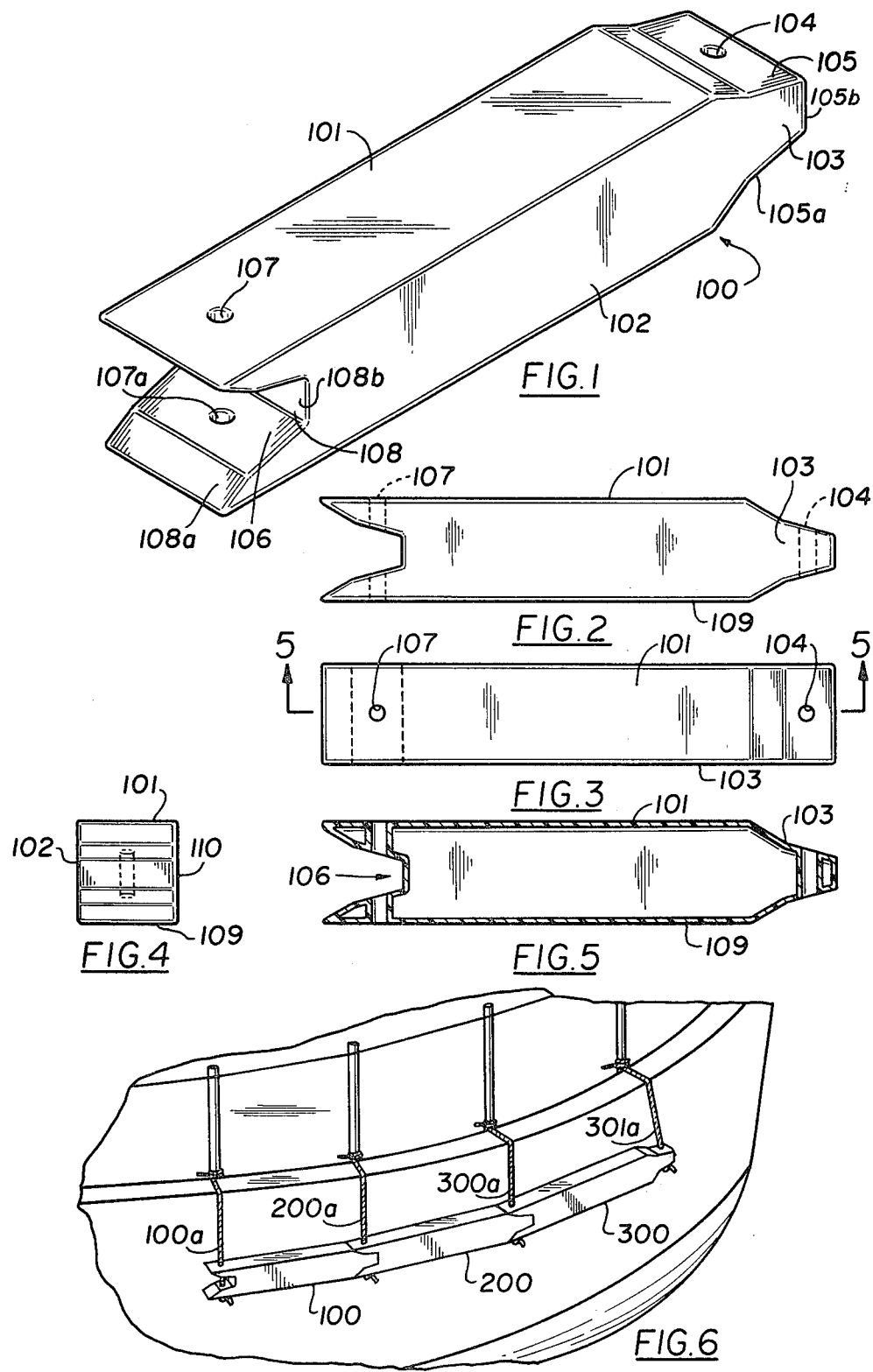

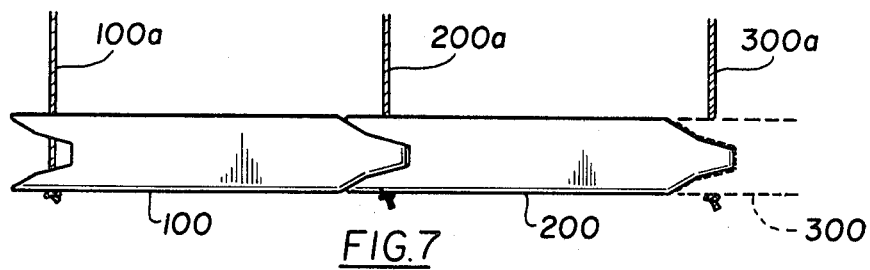
FIG.7
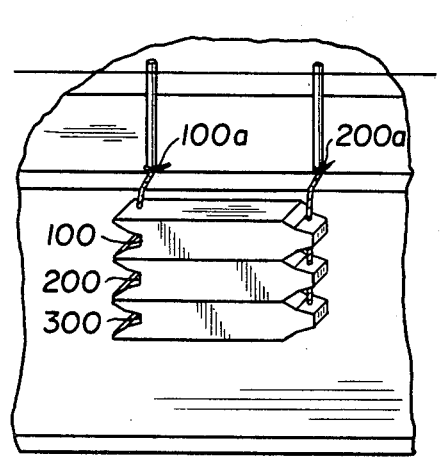
FIG.8
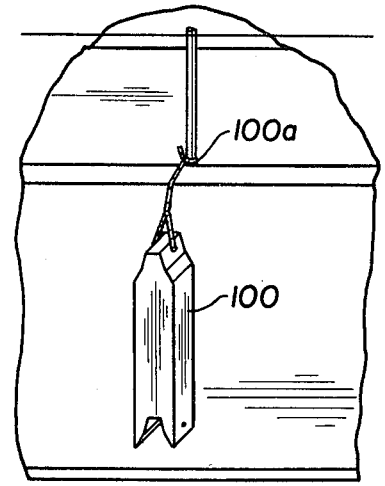
FIG.9
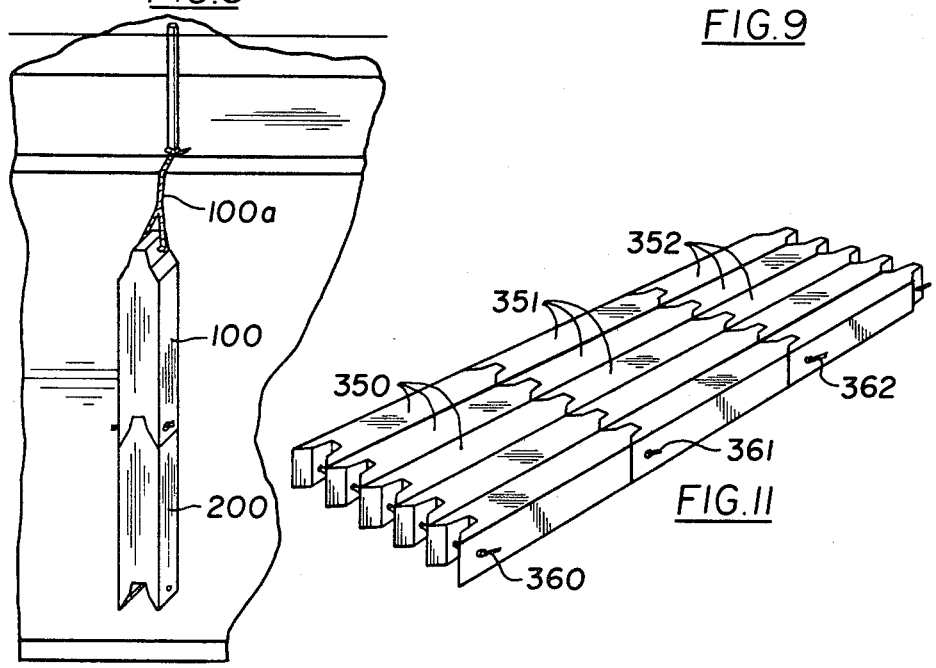
FIG.10
FIG.11

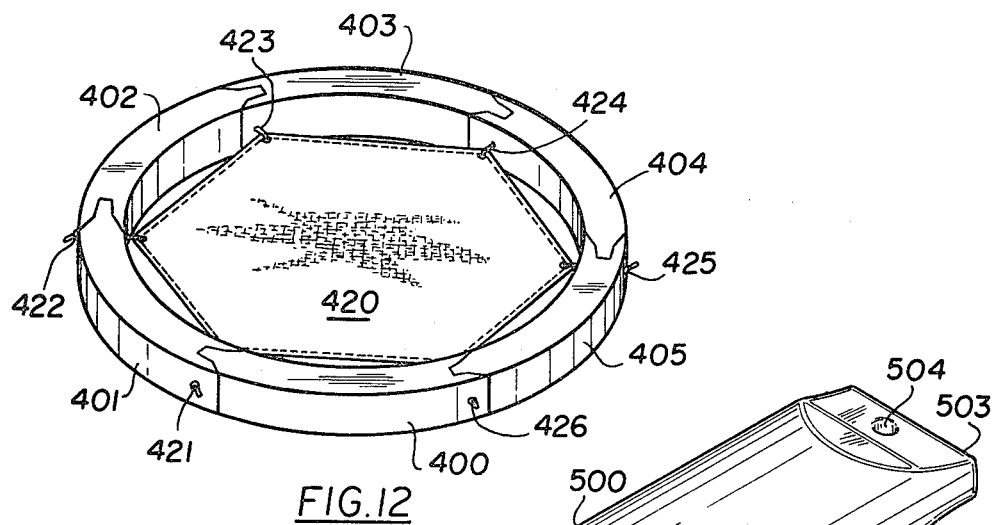
FIG.12
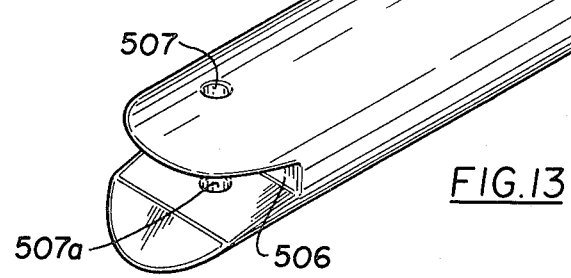
FIG.13
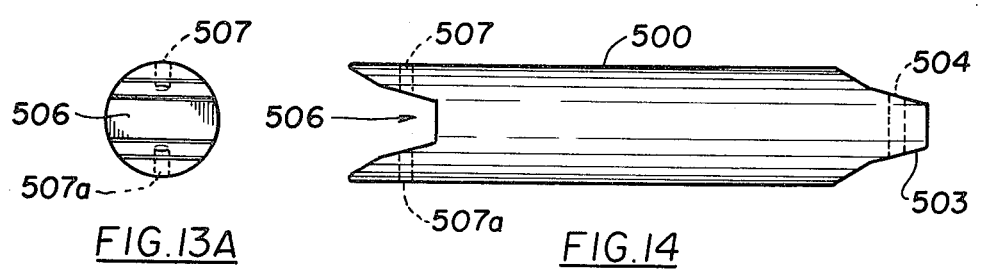
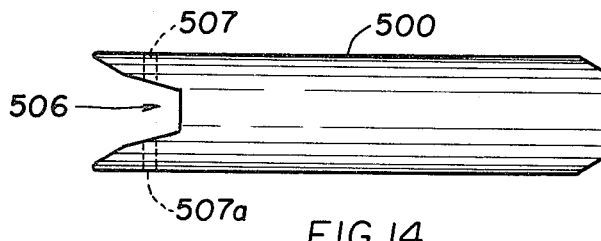
FIG.13A  FIG.14
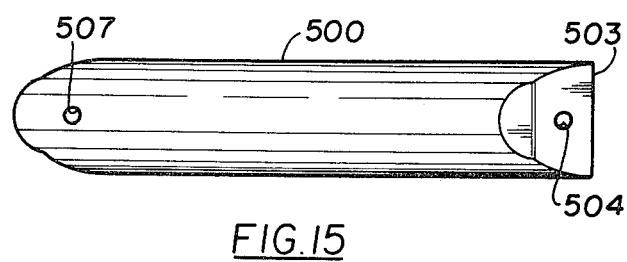
FIG.15

BOAT BUMPERS

BACKGROUND OF INVENTION

This application is a continuation-in-part of co-pending prior application, Ser. No. 59,690, filed July 23, 1979 now abandoned.

This invention relates to boat bumpers, also known as boat fenders. In particular it relates to interconnecting bumper units which enable the user to make a long bumper of desired length.

Boat bumpers have been described in the past wherein bumper units are added together to provide adequate protective length for the boat.

The most pertinent art was found in U.S. patent classification, Classes 114 and 293. For example, U.S. Pat. No. 2,062,919 describes bumper units strung together, while U.S. Pat. No. 3,861,345 has units on a common core. Other examples of boat bumpers of the prior art include U.S. Pat. Nos. 956,503; 2,903,990; 3,183,875; 3,693,572 and 4,074,649.

The prior art describes boat bumpers of a variety of constructions and shapes used with a rope or other stringer member. There has been no prior disclosure of a boat bumper assembly which provides continuous protection and adjustability in length.

One object of the present invention is to provide a boat bumper system which provides a continuous cushioning material of adjustable length.

Other objects and advantages of this invention will be apparent from the description of claims which follow taken together with the appended drawings.

SUMMARY OF INVENTION

The invention relates to a plurality of interconnecting generally identical bumper units. Each unit has a protuberance on one end and a notch on the other enabling the notch of one bumper to accept the protuberance of another. Apertures are provided so that ropes may be inserted to hold the bumper units at the desired level along the side of a boat.

A particular characteristic of this invention is that the bumper units may be arranged in any desired horizontal or vertical span length at any selected level along the side of a boat. The bumper units are typically made of resilient material so as to help absorb the shocks of collision with the boat dock.

In addition to being used as boat bumpers, the interconnecting units of this invention may also be used to form floats for working or walking and also emergency life rafts.

BRIEF DESCRIPTION OF DRAWINGS

FIG. 1 is a perspective view of a boat bumper unit of this invention.

FIG. 2 is a reduced side view.

FIG. 3 is a reduced plan view.

FIG. 4 is a reduced right end view of FIG. 1.

FIG. 5 is a section along line 5—5 of FIG. 3.

FIG. 6 is a perspective view of three bumper units interconnected and held over the side of a boat.

FIG. 7 is a side view of interconnected units.

FIG. 8 is a perspective view utilizing the units in vertical arrangement.

FIG. 9 is a perspective view of a different way of using the bumper unit.

FIG. 10 shows interconnecting units in vertical array.

FIG. 11 is a view showing the boat bumpers of this invention attached together to form a walking boat or float.

FIG. 12 shows the use of the units of this invention to form a life raft.

FIG. 13 is a perspective view of a slight variation of this invention.

FIG. 13A is a reduced end view of the embodiment of FIG. 13.

FIG. 14 is a reduced side view of the embodiment of FIG. 13.

FIG. 15 is a reduced plan view of the embodiment of FIG. 13.

SPECIFIC EXAMPLES OF INVENTION

Referring now to the drawings, in particular FIGS. 1-5, the boat bumper unit of this invention comprises an elongated resilient member 100 having flat top surface 101, vertical front surface 102, bottom surface 109, rear vertical surface 110, protuberance 103 and notch 106. Protuberance 103 has upper and lower flat surfaces 105 and 105a which taper inwardly from the top and bottom surfaces 101 and 109 and has a vertical orifice 104. Notch 106 has surfaces 108 and 108a tapering outwardly to the ends of top and bottom surfaces 101 and 109 and is provided with a pair of aligned orifices 107 and 107a.

The protuberance 103 of one bumper unit is registerable with the notch 106 of a second bumper unit so that surface 108 mates with surface 105 while surface 108a mates with surface 105a and orifices 104, 107 and 107a are aligned. It should be noted that the protuberance 103 and its matching notch 106 have flat vertical end walls 105b and 108b.

The boat bumpers of this invention can be used in various ways. Thus for example as illustrated in FIGS. 6 and 7 bumper units 100, 200 and 300 are interfitted horizontally and hung over the edge of the side of a boat by ropes 100a, 200a, 300a and 301a to form an effectively continuous bumper system which conforms to the curvature of the side of the boat and can be positioned at the desired horizontal level.

Another way of utilizing the boat bumpers of this invention will be as illustrated in FIG. 8 showing three units arranged to give a significant vertical span to the bumper arrangement. It is clear that the configuration illustrated in FIG. 8 can be given as great a horizontal span as may be desired.

The versatile boat bumper unit of this invention can also be used by suspending vertically as shown in FIGS. 9 and 10 with one or more units.

The boat bumpers of this invention can be interconnected by the boat owner to provide any desired horizontal and/or vertical span at the appropriate level which is required by the dock configuration. Since the units are relatively small they can be easily stored on board and readily assembled when approaching the dock. The units can be made of a variety of resilient materials including for example, solid or hollow neoprene rubber and inflatable units made of a variety of stretchable plastic or rubber materials.

The boat bumpers of this invention can be also used for other purposes than bumpers as for example, floats and life rafts. Thus, as illustrated in FIG. 11 rows of interconnected bumper units 350, 351 and 352 are tied together by ropes 360, 361 and 362 to form a flat floating surface which can be used as a float or for walking and then disassembled and stored again on the boat.

A life raft can be formed by attaching bumper units 400, 401, 402, 403, 404 and 405 together in a sequence as illustrated in FIG. 12 and then attaching a canvas support surface 420 by ropes 421, 422, 423, 424, 425 and 426 through the orifices in the bumper units. Another variation of the invention is illustrated in FIG. 13 which illustrates an elongated resilient member 500 of similar construction to resilient member 100 except that the body portion is round rather than flat as more particularly illustrated in FIGS. 13A, 14 and 15. The protuberance 503 and notch 506 are registerable with the notches and protuberances of adjacent members. The protuberances taper inwardly and have vertical orifices 504. The notches 506 have outwardly tapering surfaces and are provided with aligned orifices 507 and 507a.

I claim:

1. In combination, a plurality of suspension lines and a plurality of endwise interconnected elongate resilient boat bumper units extending transversely to said lines; each said bumper unit having a male protuberance at one end and a complimentary female socket at the other end, the sockets and protuberances of successive bumper units being mated with each other in a particular relative angular orientation, each said socket having two holes therethrough aligned transversely of the bumper unit elongate axis providing a straight transverse passage through the socket, and each said protuberance having a hole therethrough located to interconnect and align with said two holes of a socket mated therewith when the protuberances and sockets are mated in said particular angular orientation, whereby said protuberances and sockets mate only in said relative angular orientation wherein all said holes are interconnected and aligned; each of said suspension lines passing through the aligned holes of a respective set of mated protuberances and sockets to interlock successive bumper units into an assembly and to suspend the assembly of bumper units.

* * * * *